United States Patent [19]

Meier

[11] 3,914,627

[45] Oct. 21, 1975

[54] STORAGE DEVICE WITH SEVERAL BISTABLE FLIPFLOPS

[75] Inventor: Werner Meier, Bubenreuth, Germany

[73] Assignee: Siemens Aktiengesellschaft, Munich, Germany

[22] Filed: Dec. 27, 1973

[21] Appl. No.: 428,777

[30] Foreign Application Priority Data

Dec. 29, 1972 Germany ............................ 2264135

[52] U.S. Cl. ................ 307/238; 307/289; 328/192; 328/205

[51] Int. Cl.$^2$ ............................................ H03K 3/29

[58] Field of Search ........... 307/223, 224, 238, 289; 328/192, 205

[56] References Cited

UNITED STATES PATENTS

| | | | |
|---|---|---|---|
| 3,474,262 | 10/1969 | Turcotte | 307/223 R |
| 3,662,193 | 5/1972 | Braddock | 307/289 |
| 3,808,544 | 4/1974 | Walker | 307/223 R |

*Primary Examiner*—John Zazworsky
*Attorney, Agent, or Firm*—Kenyon & Kenyon Reilly Carr & Chapin

[57] ABSTRACT

An improved arrangement for a storage device having a plurality of bistable flipflops therein and where storage device delays are required, in which, in order to reduce the number of contact pins required, the feedback paths of all flipflops are connected through a common delay element whose output signal is then connected through gates to the input of the flipflops.

5 Claims, 2 Drawing Figures

STORAGE DEVICE WITH SEVERAL BISTABLE FLIPFLOPS

BACKGROUND OF THE INVENTION

This invention relates to storage devices in general, and more particularly to an arrangement comprised of a plurality of bistable flipflops which can be set and cleared with a delay.

In systems such as programmed control systems, pluralities of bistable flipflops which can be set and cleared with a delay are often used. The delayed setting and clearing of the individual flipflops is important since randomly occurring interference signals must be prevented from causing a permanent change of state of the flipflops in the arrangement to avoid an undesirable falsification of the signal to be stored.

One manner of obtaining this delay, which serves to reduce the interference susceptibility, is by feeding the input signals for the individual flipflops through respective delay elements associated therewith. Generally, the delay elements used are external capacitors. Such have a convenience of adjustment. However, using separate delay elements for each flipflop in the device, requires a considerable number of connecting lines and contact pins which construction is quite undesirable in regard to cost, particularly when dealing with integrated circuits. Thus, it is an object of this invention to provide an improved arrangement of this type which has a minimum number of contact pins and connecting lines.

SUMMARY OF THE INVENTION

The present invention provides such a device by feeding back the output signal of each flipflop through a common bus containing a delay element and through a gate assigned to the respective flipflop whose operation is a function of the state of the other flipflops. With is arrangement, a further advantage is obtained, in that the delay is the same for all flipflops since the same timing element is always used for the delay.

The bistable flipflops used may comprise the well known Eccles-Jordan circuit or may be two cross coupled gates as shown, for example, on pages 10 and 11 of the journal "Elektronische Rechenanlagen" (Electronic Computers), No. 1, 1967. With an arrangement such as this, a further embodiment of the invention includes the feature of each gate assigned to the set input being connected to the outputs of two blocking gates, one of which blocks the feedback signal appearing at the output of the delay element when one of the other flipflops is set, and the other which blocks the setting signal when the feedback signal is present. With this arrangement, the bistable flipflops are protected against external interference voltages that are coupled-in or are active at any point in the device.

Where it is necessary that the interference signal also be prevented from causing even a small transient change of the output signal of the flipflops due to interference voltages, a further feature of the invention comprises feeding each of the output signals through an AND gate, whose second input is connected to the output of the delay element.

DETAILED DESCRIPTION OF THE PREFERRED EMBODIMENT

Figure 1:
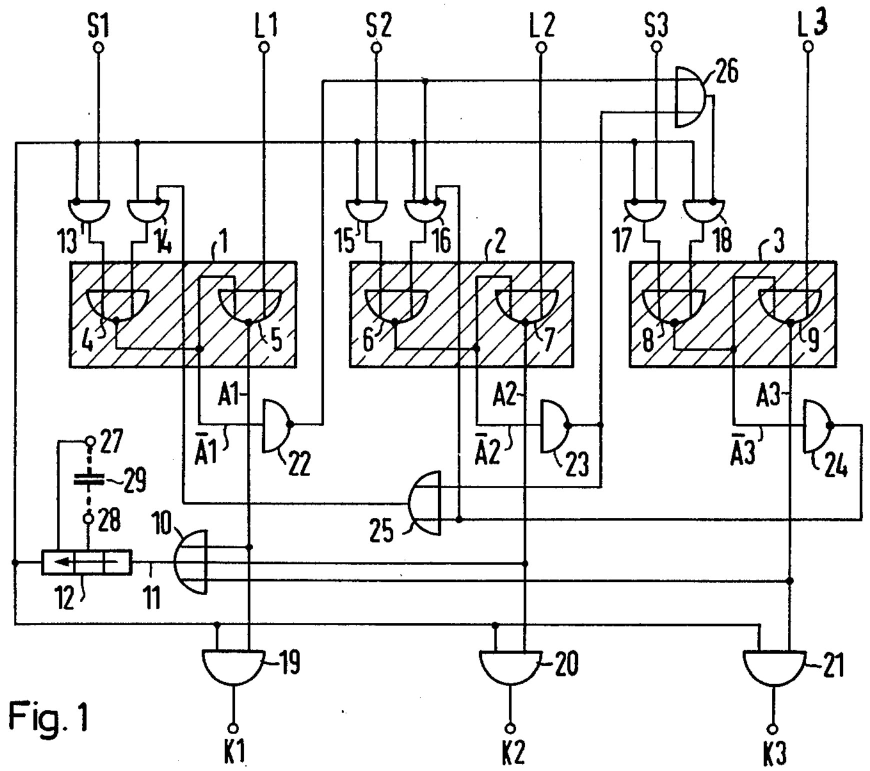
FIG. 1 is a logic diagram of a first embodiment of the invention wherein the flipflops are comprised of cross coupled NOR gates.

In the embodiments to be described below, various types of gates are used. The first type of gate is an AND gate as illustrated by gate 19. With an AND gate only when both inputs are "1" will the output be "1". The second type of gate used is an OR gate as illustrated by gate 26. To differentiate between AND gates and OR gates, the input lines are brought into the gate symbol in the OR gate. An OR gate will have a "1" output when either input is a "1". A third type of gate used is a NOR gate. This is illustrated, for example, by gate 4. A NOR gate is essentially an OR gate with an inverted output as indicated by the dot at the output terminal of the gate. A NOR gate will have a "1" output only when both of its inputs are "0". The next type of gate used is a NAND gate as, for example, the gates in the flipflop 30. A NAND gate is essentially an AND gate with an inverted output as indicated by the dot. A NAND gate will have a "0" output when both its inputs are "1"s and will have a "1" output at all other times. Also shown are AND gates and NAND gates with inverted inputs. Gate 13 is an example of an AND gate which has its left-hand input inverted as indicated by the dot. Similarly, gate 33 illustrated a NAND gate with an inverted input. A NAND gate or NOR gate may be used as an inverter in well known fashion, and thus, the various gates such as 22, 23 and 24 used as inverters, to be described below, will comprise NAND gates which have their unused inputs connected to a "1" signal. Thus, when a "1" appears on the remaining input their output will be "0". In similar fashion, NOR gates may also be used for inverters.

As illustrated by FIG. 1, the first embodiment of the present invention comprises three flipflops designated 1, 2 and 3, each made up of two cross coupled NOR gates. Thus, flipflop 1 includes NOR gates 4 and 5, flipflop 2 NOR gates 6 and 7, and flipflop 3 NOR gates 8 and 9. The outputs of the NOR gates 4, 6 and 8 are directly coupled respectively to the one input of NOR gates 5, 7 and 9. The cross coupling of the NOR gates 5, 7 and 9 back to the input of the NOR gates 4, 6 and 8 is, however, not direct through an OR gate 10, over a bus 11, through a delay element 12, and then through a gate, respectively 14, 16 or 18. As illustrated, this feedback for each of the flipflops is through common line. In addition, the output of the delay element 12 is also provided to the gates 13, 15 and 17 which have as their second inputs the set terminals Sl, S2 and S3 of flipflops 1, 2 and 3 respectively. The set output signals of the flipflops 1, 2 and 3 designated A1, A2 and A3 are provided as one input to AND gates 19, 20 and 21 respectively. These AND gates have as their second input, the output of the delay element 12. The inverted outputs of the flipflops 1, 2 and 3 designated $\overline{A1}$, $\overline{A2}$ and $\overline{A3}$ are fed through NAND gate inverters 22, 23 and 24 to the respective input gates, 14, 16 and 18. Thus, the $\overline{A1}$ signal after inversion through gate 22 is fed directly to gate 16 and through an OR gate 26 to gate 18. The $\overline{A2}$ signal is fed through NAND gate inverter 23 to the OR gate 26 and also to an OR gate 25 from which it is provided to the input gate 14. The $\overline{A3}$ output after inversion through inverter 24 is provided as the second input to OR gate 25 and also directly to the input gate 16.

The delay device 12 which is provided to convert an impulse pulse into an output pulse of the same length but with a predetermined delay, can in the simplest case comprise a symetrical RC time constant member which includes an external capacitor 29 coupled between terminals 27 and 28. Such an arrangement with a capacitor will cause the rising and falling edges of the signals generated at the outputs of NOR gates 5, 7 and 9 to be signals having a slow rise and fall time. In this manner, it is possible to make the occurrence as well as the disappearance of a signal occur so as to influence succeeding digital switching elements with a delay.

Assume that all three flipflops are reset. With this condition, the outputs of gate 5, 7 and 9 will be "0" and the outputs of gates 4, 6 and 8 will be "1". The "1" signals on the $\overline{A1}$, $\overline{A2}$, and $\overline{A3}$ lines will be inverted respectively by inverters 22, 23, and 24 which will then be providing "0"s as outputs. As a result, the outputs of gates 25 and 26 will also be "0". These "0"s which are the second inputs to gates 18, 16 and 14 are all inverted at the input to those gates, thus enabling the gate to provide a "1" output if the signal from the output of delay member 12 becomes a "1". At this point, the output of the delay member 12 will also be a "0". This "0" which is an inverted input to the gates 13, 15 and 17 enables those gates so that the respective flipflops may be set. If a set signal is now applied to the terminal S1, i.e., a "1" signal, the output of gate 13 will become a "1". This will cause the output of gate 4 to become "0" which in turn will cause the output of gate 5 to become a "1", since the reset input L1 is also at "0". The "0" output from gate 4, i.e., the signal A1, after inversion through gate 22 will become a "1" and will disable gates 16 and 18. The output A1 from gate 5 will be provided through OR gate 10 to the common bus 11 and through the delay member 12. After a predetermined delay, the "1" signal will appear at the input of gate 14. With this "1" signal at gate 14, its output will become a "1", causing the flipflop 1 to be latched. During the delay period, the "1" signal must be maintained at the terminal S1. After the delay period the flipflop 1 is latched and the signal may be removed. The "1" signal out of the delay member 12 will now also enable gate 19 and permit the final circuit output designated K1 to become a "1". With a "1" out of the delay element 12, the gates 15 and 17 will also be disabled and flipflops 2 and 3 cannot now be set. As noted above, flipflops 2 and 3 are also blocked from being set by the "1" signal at the inverted inputs of gates 16 and 18 so that the feedback signal which is also provided to those gates cannot set them.

Only if flipflop 1 is reset by applying a "1" signal to its L1 input will it be possible to set the other flipflops. When a "1" is applied to the L1 terminal, the output of gate 5 will become a "0". This "0" signal will immediately cause the output K1 to go to "0", but will be delayed through the delay device 12 for the predetermined period before a "0" signal appears enabling all three flipflops to be set. Once this occurs, the process may be repeated with any of the three flipflops being set. The gates 19, 20 and 21 act to prevent short intereference pulses at the set inputs S1, S2 and S3 from causing a temporary flipping of the flipflops 1, 2 or 3 to be seen at output terminals K1, K2 or K3. This is true since the signals at the outputs appear only after the output signal from the delay device 12 reaches a "1" level.

Figure 2:
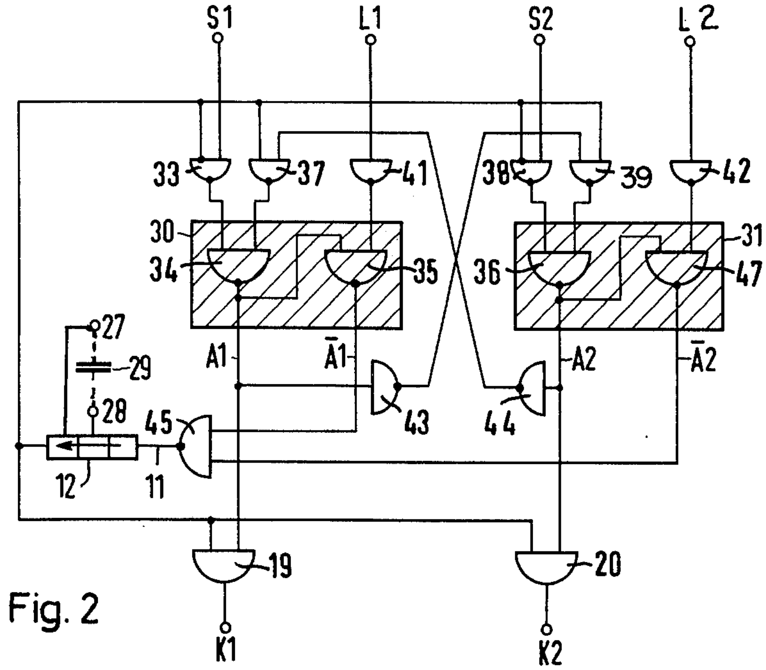
FIG. 2 is a similar diagram illustrating a device which uses almost exclusively NAND gate logic.

FIG. 2 illustrates a second embodiment of the present invention which comprises only two flipflops and which uses almost exclusively NAND logic. As illustrated, each of the flipflops 30 and 31 is made up of two NAND gates, with flipflop 30 being made up of NAND gates 34 and 35 and flipflop 31 being made up of NAND gates 36 and 47. The blocking gates at the inputs to NAND gates 34 and 36, designated gate 33, 37 38 and 39 are also NAND gates with the gates 33 and 38 having one input inverted. The inputs to gates 35 and 47 are through NAND gate inverters 41 and 42 respectively. The output gates 19 and 20 which provide the final circuit outputs K1 and K2 are AND gates as before. Because of the different logic, the cross coupling to prevent one flipflop being set when the other is set, is provided through by NAND gate inverters 43 and 44 having as respective inputs the A1 and A2 outputs of flipflops 30 and 31. The input to the common bus 11 and delay member 12 is through a NAND gate 45. In principle, operation is essentially the same as that described above. With both flipflops initially reset, A1 and A2 will be "0" and $\overline{A1}$ and $\overline{A2}$ will be "1". This will result in a "0" output at gate 45 on line 11 which will in turn, after passing through delay element 12, appear at the inputs of gates 33, 37, 38 and 39. At gates 33 and 38, this "0" is inverted and will appear as a "1". Prior to a "1" being placed on the line S1 to set the flipflop, it too will be "0". The output of NAND gate 33 under these circumstances is a "1". When a "1" is placed on the line S1 two "1"s are now present and the output, of gate 33 becomes "0". This causes gate 34 to have an output which goes from "0" to "1" which then causes the output of gate 35, $\overline{A1}$, to become a "0". This "0" at the input of gate 45 will cause its output to go to "1". After delay through the delay element 12 this "1" will appear at the input to gate 37. Since its other input is a "1" this will cause gate 37 to have an "0" output and gate 34 will continue to have a "1" output and to keep the flipflop 30 latched even with removal of the "1" on line S1. The A1 output into inverter gate 43 will cause a "0" at the input to gate 39 to prevent its output from going to "0" when the "1" appears out of the delay member 12. The remainder of the operation is the same as that described above in connection with FIG. 1. The arrangement of FIG. 2 uses almost exclusively NAND gates, thus lending itself to integrated circuit techniques.

Although only three flipflops were shown in FIG. 1 and two in FIG. 2, it will be recognized that any required number may be used with the flipflops arranged in the same type of circuit arrangement shown in the figures. These and other modifications may be made without departing from the spirit of the invention which is intended to be limited solely by the appended claims.

What is claimed is:

1. A storage device comprising:

a. a plurality of bistable flip flops each having a set input, clear input and disabling input;

b. a common bus to which an output from each flipflop is coupled, said bus including therein delay means;

c. a first plurality of gates equal in number to said plurality of flip flops with a respective output of each of said first plurality of gates coupled to the set input of a different one of said flip flops, each gate having as one input the output of said delay means and each having a second input coupled to respective setting terminals;

d. a second equal plurality of gates each having as one input the output of said delay means and each having its output coupled to the disabling input of a different one of said flip flops; and e. a third plurality of gates, each gate having an output coupled to a different one of said second plurality of gates and having an input coupled to an output of each flipflop other than the flipflop coupled to the gate of said second plurality of gates to which said output of said gate of said third plurality is coupled.

2. The invention according to claim 1 wherein each flip flop is made up of two gates, a first coupled to the setting terminal and a second to a clear input terminal with the output of the first coupled to another input of the second and wherein the output of an associated one of said second plurality of gates is a second input to said first gate.

3. The invention according to claim 2 wherein each of said first plurality of gates is adapted to be disabled in response to a delayed output from said delay means indicative of a flipflop being set and wherein each of said second plurality of gates is adapted to be disabled in response to an output from said means responsive to other flipflops indicating that another flipflop has been set.

4. The invention according to claim 2 and further including a plurality of AND gates, one associated with each flipflop having as one input the output of a respective flipflop and as a second input the output of said delay means.

5. The invention according to claim 2 wherein all of said gates and pluralities of gates are NAND gates.

* * * * *

UNITED STATES PATENT AND TRADEMARK OFFICE

CERTIFICATE OF CORRECTION

PATENT NO. : 3 914 627

DATED : October 21, 1975

INVENTOR(S) : Werner Meier

It is certified that error appears in the above-identified patent and that said Letters Patent are hereby corrected as shown below:

in column 2, line 47, change "not direct through" to read --not direct but through-- in column 3, line 64, change "intereference" to read --interference--

Signed and Sealed this

*twentieth* Day of *January 1976*

[SEAL]

*Attest:*

RUTH C. MASON
*Attesting Officer*

C. MARSHALL DANN
*Commissioner of Patents and Trademarks*